United States Patent [19]

Kendall

[11] Patent Number: 4,702,655

[45] Date of Patent: Oct. 27, 1987

[54] FASTENING SYSTEM INCLUDING AN IMPROVED INTERFERENCE FIT BLIND FASTENER AND METHOD OF MANUFACTURE

[75] Inventor: James W. Kendall, Huntington Beach, Calif.

[73] Assignee: Huck Manufacturing Company, Irvine, Calif.

[21] Appl. No.: 770,160

[22] Filed: Aug. 27, 1985

[51] Int. Cl.$^4$ .............................................. F16B 13/04
[52] U.S. Cl. ....................................... 411/43; 411/34; 411/69; 411/70; 29/522 A; 29/523; 403/2; 403/408.1
[58] Field of Search ................ 403/2, 408.1, 277, 280, 403/281, 282; 411/43, 34, 35, 38, 45, 69, 70; 29/522 A, 523, 512

[56] References Cited

U.S. PATENT DOCUMENTS

| | | | |
|---|---|---|---|
| 2,501,567 | 3/1950 | Huck | 411/70 X |
| 3,107,572 | 10/1963 | Orloff | 411/34 |
| 3,253,495 | 5/1966 | Orloff | 411/34 |
| 3,276,308 | 10/1966 | Bergere | 411/43 |
| 3,285,121 | 11/1966 | Siebol | 411/43 |
| 3,369,289 | 2/1968 | Gapp | 29/523 X |
| 3,657,957 | 4/1972 | Siebol | 411/70 |
| 3,820,297 | 6/1974 | Hurd | 403/2 |
| 4,137,817 | 2/1979 | Siebol | 411/43 |

Primary Examiner—Cornelius J. Husar
Assistant Examiner—Todd G. Williams
Attorney, Agent, or Firm—Harness, Dickey & Pierce

[57] ABSTRACT

A fastener system for securing workpieces together including a blind fastener located in aligned bores and when installed providing a preselected interference fit with the bores, the fastener including a pin and a sleeve with the pin having a shank with a sizing portion and expansion portion, the sleeve having a shank portion adapted to be pre-assembled onto the sizing portion and, while pre-assembled, having its outer surface reduced in diameter to a preselected magnitude such as to provide the desired interference with the bores when the expansion portion is moved therethrough.

18 Claims, 5 Drawing Figures

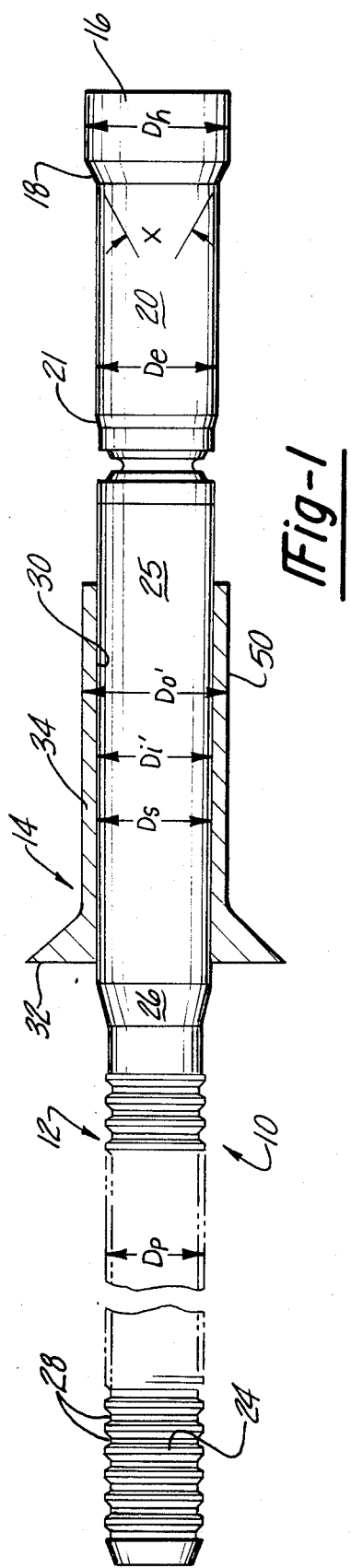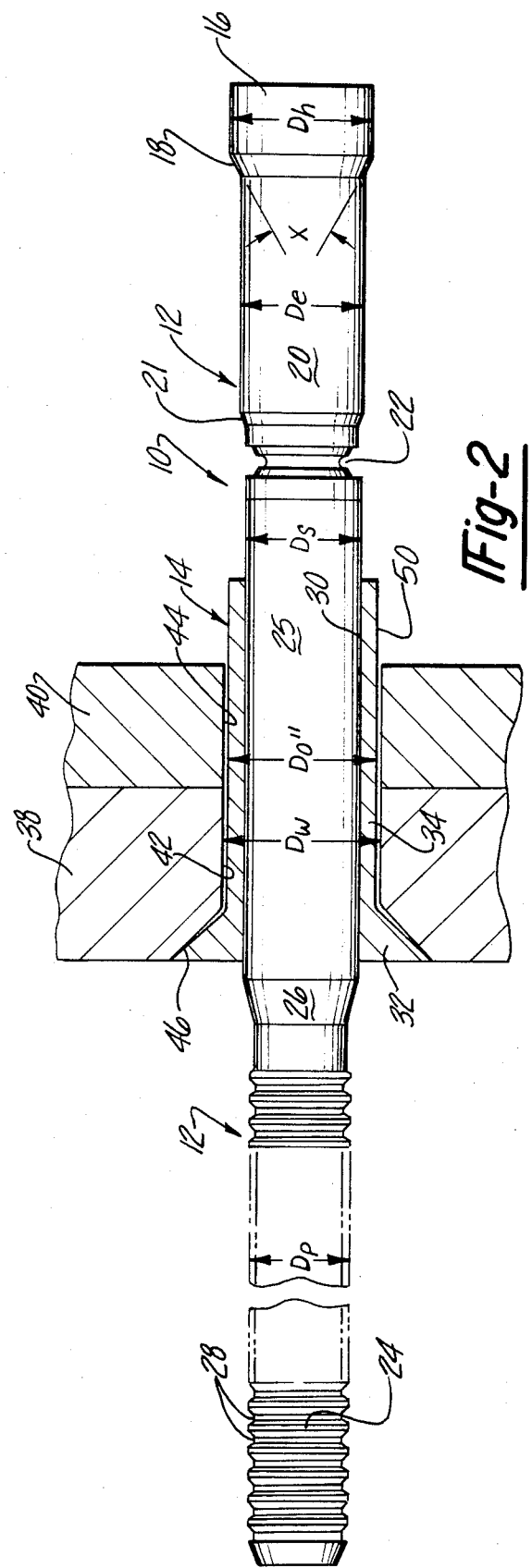

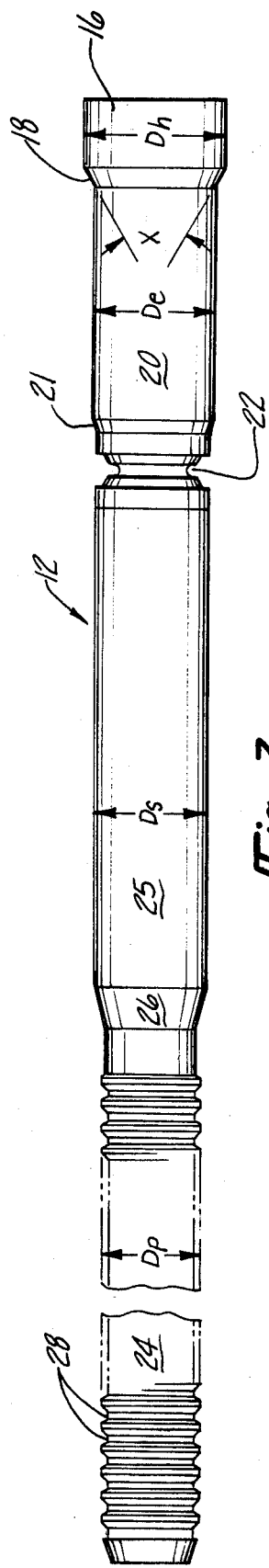
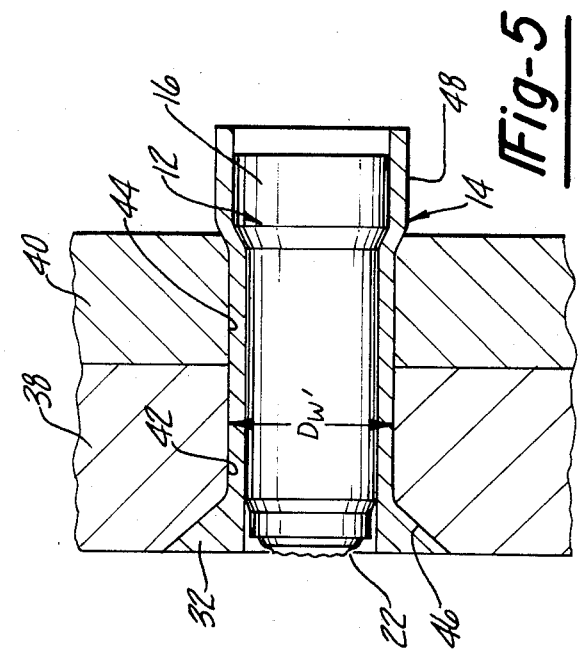
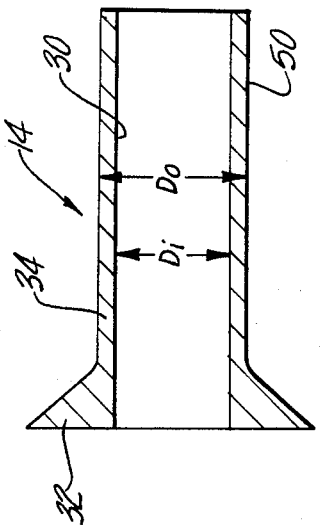

FASTENING SYSTEM INCLUDING AN IMPROVED INTERFERENCE FIT BLIND FASTENER AND METHOD OF MANUFACTURE

SUMMARY-BACKGROUND OF THE INVENTION

The present invention relates to a blind fastener fastening system and more particularly to blind fasteners adapted to be received in aligned bores in workpieces to be joined together and for providing a preselected installed interference with such bores and the method of manufacturing such fastener.

The present invention is related to and is an improvement on the invention and type fastener disclosed in the U.S. Pat. No. 3,820,297 for "Interference Fit Blind Fastener" issued to R. L. Hurd on June 28, 1974. As such, the fastener of the present invention is directed to providing a preselected interference fit with the holes of workpieces being joined. With the desired interference, improvement in fatigue and other characteristics in the fastened joint can be realized. However, the magnitude of the interference can be relatively critical and will be affected by the materials of the fastener and of the workpieces. In the past, such fasteners, because of the tight tolerances required, have been subject to painstaking manufacturing procedures resulting in a relatively costly construction. In addition the cost for workpiece hole preparation prior to installation has been considerable. The present invention addresses these problems and provides a fastener construction and method by which the fastener can be manufactured relatively inexpensively to close tolerances. At the same time, it is believed that because of the improved reliability in fastener tolerances, the tolerances required for the preparation of the workpiece holes can be relaxed sufficiently to provide significant cost savings in installation.

It is an object of the present invention to provide an improved fastening system including an improved interference fit blind fastener and method of manufacturing such fastener.

Other objects, features, and advantages of the present invention will become apparent from the subsequent description and the appended claims, taken in conjunction with the accompanying drawings.

BRIEF DESCRIPTION OF THE DRAWINGS

FIG. 1 is an elevational view with some parts shown in section depicting an interference fit blind fastener including a pin and a sleeve and embodying features of the present invention with the sleeve shown in a position for processing;

FIG. 2 is a similar view of the fastener of FIG. 1 with the pin and sleeve shown in a final assembled position after processing and with the fastener located in workpiece openings;

FIG. 3 is a fragmentary view of the pin of the fastener of FIG. 1;

FIG. 4 is a fragmentary sectional view of the sleeve of the fastener of FIG. 1; and FIG. 5 is a fragmentary, sectional view of the fastener of FIG. 1 as installed in the workpieces.

Looking now to the drawings, a blind fastener assembly 10 is shown in FIG. 1 and includes a pin 12 (FIG. 3) and a sleeve 14 (FIG. 4). The pin 12 has an enlarged head 16 connected to a smooth expansion shank portion 20 via a tapered portion 18. A breakneck groove 22 is connected to the shank portion 20 via a tapered portion 21 and to a reduced diameter intermediate or sizing shank portion 25. A gripping portion 24 is further reduced in diameter and is connected to the intermediate shank portion 25 via a tapered portion 26. The gripping portion 24 comprises a plurality of annular pull grooves 28 which facilitate gripping of the pin 12 whereby the fastener 10 can be set by a tool of known construction.

Cooperating with the pin 12 is the sleeve 14 which is hollow, having a generally uniform through bore 30 of a relaxed diameter Di (FIG. 4). The sleeve 14 has an enlarged, frusto conically shaped head portion 32 connected to a smooth shank 34 of a uniform outside relaxed diameter Do. The diameter Di of bore 30 of sleeve 14 is larger in diameter than the maximum diameter Dp of pull portion 24 of pin 12 and hence the sleeve 14 slips readily over that portion; however, the sizing shank portion 25 has a diameter Ds which is slightly larger in diameter than the bore 30 and hence when the sleeve 14 is assembled to the pin 12 the shank 34 will be slightly radially expanded as it is press fitted onto the shank portion 25; in this manner the two pieces are held together and in addition a sizing function is performed which facilitates the construction of the fastener 10 having the advantages noted.

The fastener 10 can be used to secure a pair of workpieces 38 and 40 which are provided with aligned bores 42 and 44, respectively (FIG. 2). Bore 44 is uniform while bore 42 terminates in a frusto conically shaped portion 46. In operation the fastener 10, assembled as shown in FIG. 1 (but modified in a manner to be described), is located in the bores 42 and 44 with the enlarged head portion 32 of sleeve 14 matingly located in the conical bore portion 46. The shank 34 of the sleeve 14 is located in bores 42 and 44 with a close tolerance but clearance fit and extends partially beyond the end wall of the workpiece 40. Next a relative axial force is applied between the pin 12 and sleeve 14; this can be done by a known tool which grips the pull grooves 28 of the pin 12 and pulls the pin 12 while applying a reaction force to the sleeve head portion 32. As the pin 12 is pulled, the shank portion 20 of the pin 12 is moved into the bore 30 of the sleeve 14. While the intermediate shank portion 25 provides a slight, press fit with bore 30, the expansion shank portion 20 is of a diameter De, which is greater than diameter Ds of shank portion 25; the diameter De is predetermined to provide a desired interference with the sleeve bore 30; this desired interference is selected to cause expansion of the sleeve shank 34 whereby it will expand in the workpiece bores 42, 44 to provide the necessary magnitude of interference with the bores 42, 44 to stress the bores 42, 44 to the desired amount.

As the head 16 is pulled into the sleeve bore 30 the tapered portion 18 expands the free end of the sleeve shank 34 to form an enlarged, tulip head 48 (FIG. 5). When the tapered portion 18 moves to a position in line with the rear surface of workpiece 40 the motion of the pin 12 is effectively stopped and the pulling force of the tool increases until a preselected magnitude is reached at which the pin 12 will break at the breakneck 22, leaving the installed fastener as shown in FIG. 5. The remainder of pin 12 will be frictionally held to the expanded sleeve 14.

Fasteners similar in general physical appearance to that shown in the drawings have been provided for expansion of a sleeve to fill the holes in the workpieces; however, such fasteners have utilized a pin member designed to wire draw after the initial sleeve expansion provides hole fill; this results in little effective stressing of the workpiece holes or bores. With the present construction (as with that shown in the noted Hurd patent), the desired interference is not provided merely by preventing wire drawing through an increase in the strength of the pin since ancillary problems such as sleeve extrusion, excessive installation loads, etc., can occur. Here the interference fit blind fastener is provided by a careful balancing of the strengths of the pin 12 and sleeve 14 considering the characteristics of the material of the workpieces 38, 40.

The magnitude of the final, desired interference between the set fastener and the workpiece bores will vary as a function of the area or of the diameter of the bores. This interference in terms of expansion in bore diameter can be expressed as a percentage, i.e., interference to bore diameter. It is desirable that this percentage interference be between around 0.5 percent and 1 percent with the preferred interference being around 0.75% over the maximum workpiece hole diameter.

As noted in order to obtain the desired interference, the strengths of the pin 12 and sleeve 14 of the fastener 10 must be carefully balanced with the strength of the workpieces 38, 40. Thus the pin 12 must be of sufficient strength to withstand the frictional forces encountered during setting without significant yielding or wire drawing. The sleeve 14 should be of a strength whereby it will elastically expand sufficiently to fill the holes or bores 42, 44 and to radially expand the holes 42, 44 to the desired magnitude of interference fit. The sleeve 14, however, should be of a sufficient strength such that it will not yield excessively and extrude. The workpieces 38, 40 also must be of sufficient strength such that the material around the bores 42, 44 will expand but will not yield appreciably and hence will not extrude; thus the strength of the workpieces 38, 40 should be sufficient relative to the desired interference to avoid appreciable yielding and/or extrusion. In one construction satisfactory results were obtained utilizing (a) a high hardness pin 12 made of alloy steel AISI 8740 and having a Rockwell hardness of around 49–52 Rc, (b) a sleeve 14 made of Monel-QQ-0-281 and having a hardness of around 65 R15N to around 70 R15N, and (c) workpieces 38, 40 made of aluminim 2024 T3 or 7075 T6 having a Brinell hardness of around 150. It is desirable to provide the tensile strength characteristics of the sleeve 14 to be close to or greater than that of the workpieces 38, 40. Note that the pin 12 is of a higher hardness than the sleeve 14. With the construction as described above it was found advantageous to utilize an extreme pressure lubricant between the pin 12 and sleeve 14 to minimize the frictional forces. One such lubricant found to be satisfactory was a commercially available molydisulphide lubricant.

As noted the objective is to provide a preselected magnitude of interference between the outside surface 50 of the sleeve 14 and the workpiece bores or openings 42, 44 by virtue of the radial expansion of the sleeve 14 caused by the expansion shank portion 20 of the pin 12. In the past, this has been accomplished by monitoring and matching sleeves and pins and by a series of carefully controlled manufacturing procedures. Thus, with prior constructions, the sleeve bore (30) would be drilled, reamed and honed to very tight tolerances. In a similar manner the outside surface 50 of the sleeve (14) was precision ground to tight tolerances. The expansion shank portion (20) of the pin (12) was also precision ground to tight tolerances. However, even here the stack up of tolerances on the sleeve (14) and pin (12) require that the workpiece openings (42, 44) be carefully prepared to a preselected close tolerance. For example, the total tolerance on the workpiece openings or bores (42, 44) would be held to 0.0014" regardless of diameter.

In the present invention a simpler and less expensive manufacturing procedure is utilized to provide the fastener 10 having the desired interference fit advantages. To accomplish this objective, the pin 12 is constructed to have a shank portion which provides for an initial, known sizing function relative to the sleeve 14. This is accomplished by the intermediate sizing shank portion 25 which has an axial length generally the same as the sleeve bore 30. The sizing shank portion 25 while dimensioned to provide an interference or press fit with the sleeve bore 30 is still of a diameter (Ds) significantly less than the diameter (De) of the expansion shank portion 20.

In construction, the pin 12 is formed by relatively inexpensive processes such as heating and rolling. The sleeve 14 can also be formed by relatively inexpensive processes such as punching and piercing and/or drilling. The latter manufacturing processes can be readily inexpensively controlled to provide piece to piece consistency within a relatively large tolerance band which large tolerance band can be accommodated by the present invention. The large tolerance band is typically attainable without extraordinary precision or dimensional controls.

As noted the relaxed diameter Di of sleeve bore 30 and the diameter Ds of sizing shank portion 25 are provided, in one form, to have a press fit up to around 0.003" (regardless of diameter). This initial radial expansion is generally of a low magnitude and is within the elastic limit of the sleeve material. Now with the sleeve 14 initially pre-assembled onto the sizing shank portion 25, through bore 30 will be expanded to a diameter Di' which will be equal to diameter Ds of the sizing shank portion 25. The relaxed outside diameter Do will now be expanded to a larger diameter Do' (see FIG. 1). The sleeve 14, prior to the sizing or initial expansion, was constructed with a relaxed inside diameter Di and relaxed outside diameter Do such that the final expansion by the expansion shank portion 20 within openings 42, 44 would result in excessive interference; in other words, the sleeve shank portion 20 is deliberately, initially provided to be oversize to accommodate subsequent machining operations. However, with the sleeve 14 initially expanded on the sizing shank portion 25, the sleeve 14 can now be ground at its outer surface 50 to provide the required outside diameter Do" (FIG. 2) which will give the desired final interference fit with openings 42, 44. The latter can be accomplished knowing the relaxed diameters Di and Do of the sleeve 14 and knowing the sizing and expansion diameters Ds and De, respectively, of the pin 12. The diameters of the sizing shank portion 25 (Ds) and expansion shank portion 20 (De) can be readily determined on a batch basis after completion of the pin (12). For example, in processing, the pins are headed; the pull grooves are rolled; the breakneck groove is rolled or cut; the pin is heat treated, cleaned, and then both diameters Ds and De are measured without further machining of the two associated surfaces. The diameter Dw of workpiece bores 42 and 44 is also known or predictably known and hence the desired bore expansion diameter Dw' is known.

Having the preceding information, the desired cross-sectional area of the wall of sleeve 14 can be determined. The relaxed inside diameter Di, of the sleeve 14, when pre-assembled and sized on shank portion 25 to a diameter Di', will be equal to the sizing diameter Ds of portion 25; both De and Ds are known. It is now a simple matter to determine the diameter Do'' to which the outside surface 50 of the sleeve shank 34 need be ground to attain a diameter of Dw' which is greater than relaxed bore diameter Dw to provide the desired interference. This can be determined by the relationship:

$$Do'' = \sqrt{(Dw')^2 - ((De)^2 - (Ds)^2)}$$

As noted, the diameter Do'' to which the sleeve 14 is ground will be such as to provide clearance with the bores 42, 44. The final radial expansion of the sleeve 14 in installation is such as to be within the elastic limit or only slightly into yield of the sleeve material.

Thus a simple and direct method is provided by which the fastener 10 can be constructed in an economical manner. At the same time, since the final outside sleeve diameter Do'' is now more reliably controlled, the tolerances on the workpiece bores 42 and 44 need not be so closely controlled resulting in a further economy in installation.

An example of the differences in required total tolerances between the prior art system and that of the present invention can be seen from the following comparison table:

| Prior Art System | Dimension | New System |
|---|---|---|
| .0014" | Workpiece Bore Diameter (Dw) | .003" |
| .0004" | Expansion Pin Shank Diameter (De) | .0015" |
| — | Sizing Pin Shank Diameter (Ds) | .0015" |
| .0004 | Relaxed Sleeve Bore Diameter (Di) | .0015" |
| .0005 | Final Outer Sleeve Diameter (Do'') | .0005" |

The above table is generally applicable for fasteners over a wide range of diameters. Note that the prior art system has no pin portion such as the sizing shank portion 25.

Thus it can be seen that the present method and fastener construction can result in significant economies in fastener manufacture and in the workpiece preparation for installation.

When the fastener 10 is provided for use with workpieces 38, 40 of the aluminum alloys noted, the pin head 16 is provided to be of a slightly smaller diameter Dh than the initially expanded outside diameter Do' of the sleeve shank portion 20. At the same time, it has been found advantageous to provide the tapered pin portion 18 to have an included angle X of around 60°. The latter angle facilitates bulbing of the blind end of sleeve shank portion 20 while still facilitating sufficient movement of the pin 12 within sleeve 14 without excessive axial loads whereby premature pin break at the breakneck groove 22 is inhibited.

Thus it can be seen that, with the features of the present invention, the advantages of an interference fit type fastener can be secured in an economical manner.

While it will be apparent that the preferred embodiments of the invention disclosed are well calculated to fulfill the objects above stated, it will be appreciated that the invention is susceptible to modification, variation and change without departing from the proper scope or fair meansing of the invention.

What is claimed is:

1. A fastener system including a blind fastener adapted to be received in aligned bores in workpieces to be secured together and, after installation, to provide a preselected interference of desired magnitude with the aligned bores, the fastener system comprising:
   a pin having an enlarged pin head and an elongated pin shank,
   a tubular sleeve having an enlarged sleeve head and an elongated sleeve shank and adapted to be located on said elongated pin shank whereby the fastener can be installed by the application of a relative axial force between said pin and said sleeve,
   said elongated pin shank comprising a generally straight expansion portion adjacent said pin head, a generally straight sizing portion separated from said expansion portion by a breakneck groove, and a pull portion adapted to be gripped by an installation tool for setting the fastener by the application of said relative axial force, said pull portion having a maximum diameter (Dp) which is less than the sizing diameter (Ds) of said sizing portion, said expansion portion having an expansion diameter (De) which is greater than said sizing diameter (Ds) of said sizing portion,
   said sleeve having a generally uniform through bore with a relaxed first inside diameter (Di), said sleeve shank having an outer surface with a generally uniform relaxed first outside diameter (Do), said maximum diameter (Dp) of said pull portion being less than said relaxed first outside diameter (Di) of said sleeve shank, said sizing diameter (Ds) of said sizing portion being greater than said relaxed first inside diameter (Di) of said through bore, said sleeve shank having a preselected hole filling portion adapted to be engaged by said expansion portion of said pin to provide said preselected interference of desired magnitude with said aligned bores having a bore diameter (Dw) in the workpieces, said sleeve being pre-assembled on said sizing portion of said pin with a press fit to radially expand and support said sleeve shank substantially along said hole holling portion such that it will be radially expanded to an increased second outside diameter (Do') of said outer surface of said sleeve shank and thereafter said outer surface of said sleeve shank is reduced substantially along said hole filling portion to a known decreased third outside diameter (Do'') of said sleeve shank with the magnitude of said known decreased third outside diameter (Do'') of said sleeve shank being determined by the relative magnitudes of said expansion diameter (De) of said expansion portion and said sizing diameter (Ds) of said sizing portion, said decreased third outside diameter (Do'') of said sleeve shank being less than said increased second outside diameter (Do') of said sleeve shank, said known decreased third outside diameter (Do'') of said sleeve shank being less than said bore diameter (Dw) of said aligned bores whereby said pin and sleeve as pre-assembled can be received within said aligned bores in a generally clearance relationship, said expansion portion adapted to move into said sleeve shank in response to said relative axial force and to radially expand said sleeve shank to provide said preselected interference of desired magnitude with said aligned bores along said hole filling portion, the hardness of said pin, sleeve and workpieces being selected to provide said preselected interference of desired magnitude substantially within the elastic limit of said pin, sleeve and workpieces without significant wire drawing of said pin, said pin head operative relative to the end of said sleeve shank opposite from said sleeve head and in response to said relative axial force to form an enlarged blind head engageable with one side of said workpieces, the axial movement of said pin being arrested upon formation of said blind head and said pin fracturing at said breakneck groove in response to said relative axial force attaining a preselected maximum magnitude.

2. The system of claim 1 with said known decreased third outside diameter (Do") of said sleeve shank being determined by the following relationship:

$$Do'' = \sqrt{(Dw')^2 - ((De)^2 - (Ds)^2)}$$

where Dw' is the desired expanded diameter of said aligned bores.

3. The system of claim 1 with said pin constructed of a material having a hardness of from around 49 Rc to around 52 Rc, said sleeve being constructed of a material having a hardness of from around 60 R15N to around 70 R15N and with said workpieces being constructed of aluminum having a strength proximate to that of said sleeve.

4. The system of claim 3 with said pin head having a diameter less than said known decreased third outside diameter (Do") of said sleeve shank and having a tapered portion connecting said pin head to said expansion portion with said tapered portion defining an included angle of around 60°.

5. The system of claim 1, with said sizing diameter (Ds) being up to around 0.003" greater than said relaxed first inside diameter (Di) of said through bore.

6. A fastener system including a blind fastener adapted to be received in aligned bores in workpieces to be secured together and, after installation, to provide a preselected interference of desired magnitude with the aligned bores, the fastener system comprising:

a pin having an enlarged pin head and an elongated pin shank, a tubular sleeve having an enlarged sleeve head and an elongated sleeve shank and adapted to be located on said pin shank whereby the fastener can be installed by the application of a relative axial force between said pin and said sleeve, said elongated pin shank comprising a generally straight expansion portion adjacent said pin head, a generally straight sizing portion separated from said expansion portion by a breakneck groove, and a pull portion adapted to be gripped by an installation tool for setting the fastener by the application of said relative axial force, said expansion portion having an expansion diameter (De) which is greater than the sizing diameter (Ds) of said sizing portion, said sleeve having a generally uniform through bore with a relaxed first inside diameter (Di) said sleeve shank having an outer surface with a generally uniform relaxed first outside diameter (Do) said sizing diameter (Ds) of said sizing portion being greater than said relaxed first inside diameter (Di) of said through bore, said sleeve shank having a preselected hole filling portion adapted to be engaged by said expansion portion of said pin to provide said preselected interference of desired magnitude with said aligned bores having a bore diameter (Dw) in the workpieces, said sleeve being preassembled on said sizing portion of said pin with a press fit to radially expand and support said sleeve shank substantially along said hole filling portion such that it will be radially expanded to an increased second outside diameter (Do') of said outer surface of said sleeve shank and thereafter said outer surface of said sleeve shank is reduced substantially along said hole filling portion to a known decreased third outside diameter (Do") of said sleeve shank with the magnitude of said known decreased third outside diameter (Do") of said sleeve shank being determined by the relative magnitudes of said expansion diameter (De) of said expansion portion and of said sizing diameter (Ds) of said sizing portion, said known decreased third outside diameter (Do") of said sleeve shank being less than said increased second outside diameter (Do') of said sleeve shank, said known decreased third outside diameter (Do") of said sleeve shank being less than said bore diameter (Dw) of said aligned bores whereby said pin and sleeve as preassembled can be received within said workpiece bores in a generally clearance relationship, said expansion portion adapted to move into said sleeve shank in response to said relative axial force and to radially expand said sleeve shank to provide said preselected interference of desired magnitude with said aligned bores along said hole filling portion, said pin head operative relative to the end of said sleeve shank opposite from said sleeve head and in response to said relative axial force to form an enlarged blind head engageable with one side of said workpieces, the axial movement of said pin being arrested upon formation of said blind head and said pin fracturing at said breakneck groove in response to said relative axial force attaining a preselected maximum magnitude.

7. The system of claim 6 with said known decreased third outside diameter (Do") of said sleeve shank being determined by the following relationship:

$$Do'' = \sqrt{(Dw')^2 - ((De)^2 - (Ds)^2)}$$

where Dw' is the desired expanded diameter of said aligned bores.

8. A fastener system including a blind fastener adapted to be received in aligned bores in workpieces to be secured together and, after installation, to provide a preselected interference of desired magnitude with the aligned bores, the fastener system comprising:

a pin having an enlarged pin head and an elongated pin shank, a tubular sleeve having an enlarged sleeve head and an elongated sleeve shank and adapted to be located on said pin shank whereby the fastener can be installed by the application of a relative axial force between said pin and said sleeve, said elongated pin shank comprising a generally straight expansion portio adjacent said pin head, a generally straight sizing portion separated from said expansion portion by a breakneck groove, and a pull portion adapted to be gripped by an installation tool for setting the fastener by the application of said relative axial force, said expansion portion having an expansion diameter (De) which is greater than the sizing diameter (Ds) of said sizing portion, said sleeve having a generally uniform through bore with a relaxed first inside diameter (Di) said sleeve shank having an outer surface with a generally uniform relaxed first outside diameter (Do), said sizing diameter (Ds) of said sizing portion being greater than said relaxed first inside diameter (Di) of said through bore, said sleeve being pre-assembled on said sizing portion of said pin with a press fit to radially expand and support said sleeve shank to have said outer surface of said sleeve shank with an increased second outside diameter (Do'), said increased second outside diameter of said sleeve outer surface being reduced to a known decreased third outside diameter (Do") of said sleeve shank while supported on said sizing portion, said known decreased third outside diameter (Do") of said sleeve shank being selected relative to the bore diameter (Dw) of said aligned bores whereby said pin and sleeve as pre-assembled can be received within said aligned bores, said expansion portion adapted to move into said sleeve shank in response to said relative axial force and to radially expand said sleeve shank to provide said preselected interference of desired magnitude with said aligned bores, said pin head operative relative to the end of said sleeve shank opposite from said sleeve head and in response to said relative axial force to form an enlarged blind head engageable with one side of said workpieces, the axial movement of said pin being arrested upon formation of said blind head and said pin fracturing at said breakneck groove in response to said relative axial force attaining a preselected maximum magnitude.

9. A fastener system including a blind fastener adapted to be received in aligned bores in workpieces to be secured together and, after installation, to provide a preselected interference of desired magnitude with the aligned bores, the fastener system comprising:

a pin having an enlarged pin head and an elongated pin shank, a tubular sleeve having an enlarged sleeve head and an elongated sleeve shank and adapted to be located on said pin shank whereby the fastener can be installed by the application of a relative axial force between said pin aid said sleeve, said elongated pin shank comprising a generally straight expansion portion adjacent said pin head, a generally straight sizing portion separated from said expansion portion by a breakneck groove, and a pull portion adapted to be gripped by an installation tool for setting the fastener by the application of said relative axial force, said expansion portion having an expansion diameter (De) which is greater than the sizing diameter (Ds) of said sizing portion, said sleeve having a generally uniform through bore with a relaxed first inside diameter (Di), said sleeve shank having a generally uniform relaxed first outside diameter (Do), said sizing diameter (Ds) of said sizing portion being greater than said relaxed first inside diameter (Di) of said through bore, said sleeve shank having a preselected hole filling portion adapted to be engaged by said expansion portion of said pin to provide said preselected interference of desired magnitude with said aligned bores having a bore diameter (Dw) in the workpieces, said sleeve being pre-assembled on said sizing portion of said pin with a press fit to radially expand and support said sleeve shank substantially along said hole filling portion to have an outer surface with an increased second outside diameter (Do') of said sleeve shank, said increased second outside diameter of said outer surface of said sleeve shank being reduced to a known decreased outside diameter (Do") of said sleeve shank while supported on said sizing portion, the magnitude of said known decreased outside diameter (Do") of said sleeve shank being determined by the relative magnitudes of said expansion diameter (De) of said expansion portion and of said sizing diameter (Ds) of said sizing portion, the known decreased third outside diameter (Do") of said sleeve shank being preselected relative to said bore diameter (Dw) of said aligned bores whrerby said pin and sleeve as pre-assembled can be received within said aligned bores with a preselected fit, said expansion portion adapted to move into said sleeve shank in response to said relative axial force and to radially expand said sleeve shank to provide said preselected interference of desired magnitude with said aligned bores, the hardness of said pin, sleeve and workpieces being selected to provide said preselected interference of desired magnitude substantially within the elastic limit of said pin, sleeve and workpieces without significant wire drawing of said pin, said pin head operative relative to the end of said sleeve shank opposite from said sleeve head and in response to said relative axial force to form an enlarged blind head engageable with one side of said workpieces, the axial movement of said pin being arrested upon formation of said blind head and said pin fracturing at said breakneck groove in response to said relative axial force attaining a preselected maximum magnitude.

10. In a fastener system including a blind fastener adapted to be received in aligned bores in workpieces to be secured together and, after installation, to provide a preselected interference of desired magnitude with the aligned bores, the method of providing a fastened joint with said preselected interference of desired magnitude comprising:

providing a pin having an enlarged pin head and an elongated pin shank, providing a tubular sleeve having an enlarged sleeve head and an elongated sleeve shank and adapted to be located on said pin shank whereby the fastener can be installed by the application of a relative axial force between said pin and said sleeve, providing said elongated pin shank to have a generally straight expansion portion adjacent said pin head, a generally straight sizing portion separated from said expansion portion by a breakneck groove, and a pull portion adapted to be gripped by an installation tool for setting the fastener by the application of said relative axial force, providing the pull portion to have a maximum diameter (Dp) which is less than said sizing diameter (Ds) of said sizing portion, providing said expansion portion to have an expansion diameter (De) which is greater than said sizing diameter (Ds) of said sizing portion, determining the magnitudes of said expansion diameter (De) of said expansion portion and of said sizing diameter (Ds) of said sizing portion, providing said sleeve to have a generally uniform through bore with a relaxed first inside diameter (Di), providing said sleeve shank to have a generally uniform relaxed first outside diameter (Do), providing said maximum diameter (Dp) of said pull portion to be less than said relaxed first inside diameter (Di) of said sleeve portion, providing said sizing diameter (Ds) of said sizing portion to be greater than said relaxed first inside diameter (Di) of said through bore to provide for a press fit therebetween, assembling said sleeve onto said sizing portion of said pin with a press fit to radially expand said sleeve shank to have an outer surface of an increased second outside diameter (Do') with said through bore of said sleeve being expanded to a second increased inside diameter (Di') which is equal to said sizing diameter (Ds) of said sizing portion, reducing said second increased outside diameter of said outer surface of said sleeve shank to a known decreased third outside diameter (Do") the magnitude of which is determined by the relative magnitudes of said expansion diameter (De) of said expansion portion and said sizing diameter (Ds) of said sizing portion such that on installation said sleeve outer surface will provide said preselected interference of desired magnitude with the diameter (Dw) of said aligned bores, said known decreased third outside diameter (Do") being less than said diameter (Dw) of said aligned bores whereby said pin and sleeve as pre-assembled can be received within said aligned bores in a generally clearance relationship, moving said expansion portion into said sleeve shank in response to said relative axial force and radially expanding said sleeve shank to provide said preselected interference of desired magnitude with said aligned bores, providing said pin head to be operative relative to the end of said sleeve shank opposite from said sleeve head and in response to said relative axial force to form an enlarged blind head engageable with one side of said workpieces, the axial movement of said pin being arrested upon formation of said blind head and said pin fracturing at said breakneck groove in response to said relative axial force attaining a preselected maximum magnitude.

11. A fastener system including a blind fastener adapted to be received in aligned bores in workpieces to be secured together and, after installation, to provide a preselected interference of desired magnitude with the aligned bores, the fastener system comprising:

a pin having an enlarged pin head and an elongated pin shank, a tubular sleeve having an enlarged sleeve head and an elongated sleeve shank and adapted to be located on said pin shank whereby the fastener can be installed by the application of a relative axial force between said pin and said sleeve, said elongated pin shank comprising a generally straight expansion portion adjacent said pin head, a generally straight sizing portion separated from said expansion portion by a breakneck groove, and a pull portion adapted to be gripped by an installation tool for setting the fastener by the application of said relative axial force, said expansion portion having an expansion diameter diameter (De) which is greater than the sizing diameter (Ds) of said sizing portion, said sleeve having a generally uniform through bore with a relaxed first inside diameter (Di), said sleeve shank having a generally uniform relaxed first outside diameter (Do), said sizing diameter (Ds) of said sizing portion being greater than said relaxed first inside diameter (Di) of said through bore, said sleeve being pre-assembled on said sizing portion of said pin with a press fit to radially expand the outer surface of said sleeve shank to an increased second outside diameter (Do'), reducing said outer surface to a known decreased third outside diameter (Do") of said sleeve shank, said known decreased third outside diameter (Do") of said sleeve shank being selected relative to the bore diameter (Dw) of said aligned bores whereby said pin and sleeve as preassembled can be received within said aligned bores with a preselected fit, said expansion portion adapted to move into said sleeve shank in response to said relative axial force and to radially expand said sleeve shank to provide said preselected interference of desired magnitude with said aligned bores, said pin head operative relative to the end of said sleeve shank opposite from said sleeve head and in response to said relative axial force to form an enlarged blind head engageable with one side of said workpieces, the axial movement of said pin being arrested upon formation of said blind head and said pin fracturing at said breakneck groove in response to said relative axial force attaining a preselected maximum magnitude.

12. The system of claim 11 with said known decreased third outside diameter (Do") of said sleeve shank being determined by the following relationship:

$$Do'' = \sqrt{(Dw')^2 - ((De)^2 - (Ds)^2)}$$

where Dw' is the desired expanded diameter of said aligned bores.

13. The system of claim 11 with said pin constructed of a material having a hardness of from around 49 Rc to around 52 Rc, said sleeve being constructed of a material having a hardness of from around 60 R15N to around 70 R15N and with said workpieces being constructed of aluminum having a strength proximate to that of said sleeve.

14. The system of claim 13 with said pin head having a diameter less than said known decreased third outside diameter (Do") of said sleeve shank and having a tapered portion connecting said pin head to said expansion portion with said tapered portion defining an included angle of around 60°.

15. The system of claim 11, with said sizing diameter (Ds) being up to around 0.003" greater than said relaxed first inside diameter (Di) of said through bore.

16. In a fastener system including a blind fastener adapted to be received in aligned bores in workpieces to be secured together and, after installation, to provide a preselected interference of desired magnitude with the aligned bores, the method of providing a fastened joint with said preselected interference comprising:

providing a pin having an enlarged pin head and an elongated pin shank, providing a tubular sleeve having an enlarged sleeve head and an elongated sleeve shank and adapted to be located on said pin shank whereby the fastener can be installed by the application of a relative axial force between said pin and said sleeve, providing said elongated pin shank to have a generally straight expansion portion adjacent said pin head, a generally straight sizing portion separated from said expansion portion by a breakneck groove, and a pull portion adapted to be gripped by an installation tool for setting the fastener by the application of said relative axial force, said expansion portion having an expansion diameter (De) which is provided to be greater than said sizing diameter (Ds) of said sizing portion, providing said sleeve to have a generally uniform through bore with a relaxed first inside diameter (Di), providing said sleeve shank to have a generally uniform relaxed first outside diameter (Do), providing said sizing diameter (Ds) of said sizing portion to be greater than said relaxed first inside diameter (Di) of said sleeve portion, assembling said sleeve onto said sizing portion of said pin with a press fit to radially expand said sleeve shank to have an outer surface with an increased second outside diameter (Do') with through bore of said sleeve being expanded to a second increased inside diameter (Di') which is equal to said sizing diameter (Ds) of said sizing portion, reducing said increased second outside diameter of said outer surface of said sleeve shank to a known third decreased outside diameter (Do") such that on installation said outer surface will provide said preselected interference of desired magnitude with the bore diameter (Dw) of said aligned bores, said known third decreased outside diameter (Do") being provided relative to said bore diameter (Dw) of said aligned bores whereby said pin and sleeve as pre-assembled can be received within said aligned bores with a preselected fit, said expansion portion adapted to move into said sleeve shank in response to said relative axial force and to radially expand said sleeve shank to provide said preselected interference of desired magnitude with said aligned bores, providing said pin head to be operative relative to the end of said sleeve shank opposite from said sleeve head and in response to said relative axial force to form an enlarged blind head engageable with one side of said workpieces, the axial movement of said pin being arrested upon formation of said blind head and said pin fracturing at said breakneck groove in response to said relative axial force attaining a preselected maximum magnitude.

17. The method of claim 16 including determining the magnitudes of said expansion diameter and of said sizing diameter (Ds) of said expansion portion and of said sizing portion, respectively, and forming said outer surface to said known third decreased outside diameter (Do") based upon the relative magnitudes of said expansion diameter (De) and of said sizing diameter (Ds) of said expansion portion and of said sizing portion, respectively.

18. The method of claim 16 including determining the magnitudes of said sizing diameter (Ds) and of said expanding diameter (De) of said sizing portion and said expanding portion, respectively, and forming said known third decreased outside diameter (Do") of said sleeve shank to have a magnitude in accordance with the following relationship:

$$Do'' = \sqrt{(Dw')^2 - ((De)^2 - (Ds)^2)}$$

where Dw' is the desired expanded diameter of said aligned bores.

* * * * *